(12) United States Patent
Fan et al.

(10) Patent No.: US 9,631,932 B2
(45) Date of Patent: Apr. 25, 2017

(54) CROWD SOURCED INTERACTION OF BROWSING BEHAVIOR IN A 3D MAP

(71) Applicant: Nokia Technologies Oy, Espoo (FI)

(72) Inventors: Lixin Fan, Tampere (FI); Kimmo Tapio Roimela, Tampere (FI); Yu You, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/731,997

(22) Filed: Jun. 5, 2015

(65) Prior Publication Data

US 2016/0356600 A1    Dec. 8, 2016

(51) Int. Cl.
*G01C 21/36* (2006.01)
*G01C 21/00* (2006.01)

(52) U.S. Cl.
CPC ....... *G01C 21/005* (2013.01); *G01C 21/3638* (2013.01)

(58) Field of Classification Search
CPC ........... G06F 17/30058; G06F 17/3087; G06F 17/30867; G06F 17/30873; G06F 17/30864; G06F 3/04815; G06C 30/02; G06C 30/0601; G06C 30/0631; G06C 30/0633; G06C 50/01; H04L 67/22; H04L 51/32
See application file for complete search history.

(56) References Cited

U.S. PATENT DOCUMENTS

| | | | | |
|---|---|---|---|---|
| 5,276,785 A | * | 1/1994 | Mackinlay | .......... G06F 3/04815 345/427 |
| 7,966,632 B1 | * | 6/2011 | Pan | ..................... H04N 5/44543 725/45 |
| 8,098,245 B2 | | 1/2012 | Chen et al. | |
| 8,294,732 B2 | | 10/2012 | Cheng et al. | |

(Continued)

FOREIGN PATENT DOCUMENTS

| | | |
|---|---|---|
| CN | 102853842 A | 1/2013 |
| WO | WO-2012071445 A2 | 5/2012 |
| WO | WO-2013041517 A1 | 3/2013 |

OTHER PUBLICATIONS

Chen et al. "History Assisted View Authoring for 30 Models". ACM Human Factors in Computing Systems. 2014. pp. 2027-2036.

(Continued)

*Primary Examiner* — Thomas Tarcza
*Assistant Examiner* — Edward J Pipala
(74) *Attorney, Agent, or Firm* — Mintz Levin Cohn Ferris Glovsky and Popeo, P.C.

(57) ABSTRACT

Methods and apparatus, including computer program products, are provided for mapping. In one aspect there is provided a method which may include sampling a position and a viewpoint of a three-dimensional map view presented at a browser while traversing the three-dimensional map; sending to a database a query including the sampled position and the sampled viewpoint; and receiving, in response to the sent query, a recommended browsing path including a recommended position and a recommended viewpoint for (Continued)

traversing the three-dimensional map presented at the browser. The recommended browsing path represents an aggregation including crowd-sourced information for position and viewpoint. Related apparatus, systems, methods, and articles are also described.

23 Claims, 10 Drawing Sheets

(56) References Cited

U.S. PATENT DOCUMENTS

| | | | |
|---|---|---|---|
| 8,768,625 | B2 | 7/2014 | Kritt et al. |
| 8,832,599 | B2 | 9/2014 | Deb |
| 2003/0179231 | A1* | 9/2003 | Kamiwada .......... G06F 3/04815 715/757 |
| 2005/0125148 | A1 | 6/2005 | Van Buer et al. |
| 2007/0237420 | A1* | 10/2007 | Steedly .................. G06K 9/32 382/284 |
| 2008/0140674 | A1* | 6/2008 | Ishikawa ........... G06F 17/30867 |
| 2008/0294782 | A1 | 11/2008 | Patterson |
| 2011/0310088 | A1 | 12/2011 | Adabala et al. |
| 2012/0041672 | A1 | 2/2012 | Curtis et al. |
| 2012/0210353 | A1* | 8/2012 | Wong ................. H04N 21/4126 725/37 |
| 2013/0050260 | A1* | 2/2013 | Reitan ..................... G06F 3/011 345/633 |
| 2013/0222369 | A1 | 8/2013 | Huston et al. |
| 2014/0012918 | A1 | 1/2014 | Chin et al. |
| 2014/0173462 | A1 | 6/2014 | Mattingly et al. |
| 2014/0257697 | A1 | 9/2014 | Gishen |
| 2014/0280504 | A1* | 9/2014 | Cronin ..................... H04L 67/38 709/203 |
| 2014/0280644 | A1* | 9/2014 | Cronin ..................... H04L 67/38 709/206 |
| 2015/0279081 | A1* | 10/2015 | Monk ................... G06T 3/0031 345/419 |
| 2016/0027209 | A1* | 1/2016 | Demirli ................... G06F 3/015 345/419 |

OTHER PUBLICATIONS

Cricri et al. "Multimodal Semantics Extraction from User-Generated Videos". Advances in Multimedia. 2012. pp. 1-17.

Nield, D. "Create an HD Fly-Through Video Tour in Google Earth Pro", Feb. 26, 2015. Retrieved from the Internet on Dec. 6, 2016 <http://fieldguide.gizmodo.comicreate-an-hd-fly-through-video-tour-in-google-earth-pro-1687925998>.

Open Geospatial Consortium, Inc. "OGC 07-147r2", Apr. 14, 2008. Retrieved from the Internet on Dec. 6, 2016 http://portal.opengeospatial.org/files/?artifact_id=27810.

* cited by examiner

CROWD SOURCED INTERACTION OF BROWSING BEHAVIOR IN A 3D MAP

FIELD

The subject matter disclosed herein relates to navigation systems.

BACKGROUND

Electronic maps and navigation systems have enabled users to find their way to virtually any destination. Three-dimensional maps may provide, as a third dimension, perspective views of buildings and the like. As such, these three-dimensional maps allow a viewer to see the route being, or about to be, traveled in a more realistic manner, when compared to two-dimensional maps. For example, a user can browse through the map to get a perspective view of landmarks, street scenes, and other scenes along a route—enabling the viewer to feel as if he or she is actually on the route.

SUMMARY

Methods and apparatus, including computer program products, are provided for mapping.

In some example embodiments, there is provided a method. The method may include sampling a position and a viewpoint of a three-dimensional map view presented at a browser while traversing the three-dimensional map; sending to a database a query including the sampled position and the sampled viewpoint; and receiving, in response to the sent query, a recommended browsing path including a recommended position and a recommended viewpoint for traversing the three-dimensional map presented at the browser, wherein the recommended browsing path represents an aggregation including crowd-sourced information for position and viewpoint.

In some example embodiments, one of more variations may be made as well as described in the detailed description below and/or as described in the following features. The aggregation may include past samples of position information. The aggregation may include past samples of viewpoint information. The crowd-sourced information for position and viewpoint may include past samples of position information and past samples of viewpoint information obtained from a plurality of users coupled by at least one of a network or a social network. The position may represent a latitude, a longitude, and an altitude. The viewpoint may represent a look angle from the perspective of a virtual camera generating the three-dimensional map view. The recommended browsing path may be determined from a query of at least one spatial cluster stored at a database. The at least one spatial cluster may be stored as a node including at least one of camera pose information, target information, bounding object information, motion information, or user information. The method may include initiating, based on the received recommended browsing path, a connection to another user equipment having a same or similar recommended browsing path. The method may include selecting the received recommended browsing path for traversing the three-dimensional map presented at the browser. The method may include receiving, in response to the sent query, a first recommended browsing path and a second recommended browsing path; and selecting from one of the first recommended browsing path, the second recommended browsing path, or a freestyle browsing mode.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
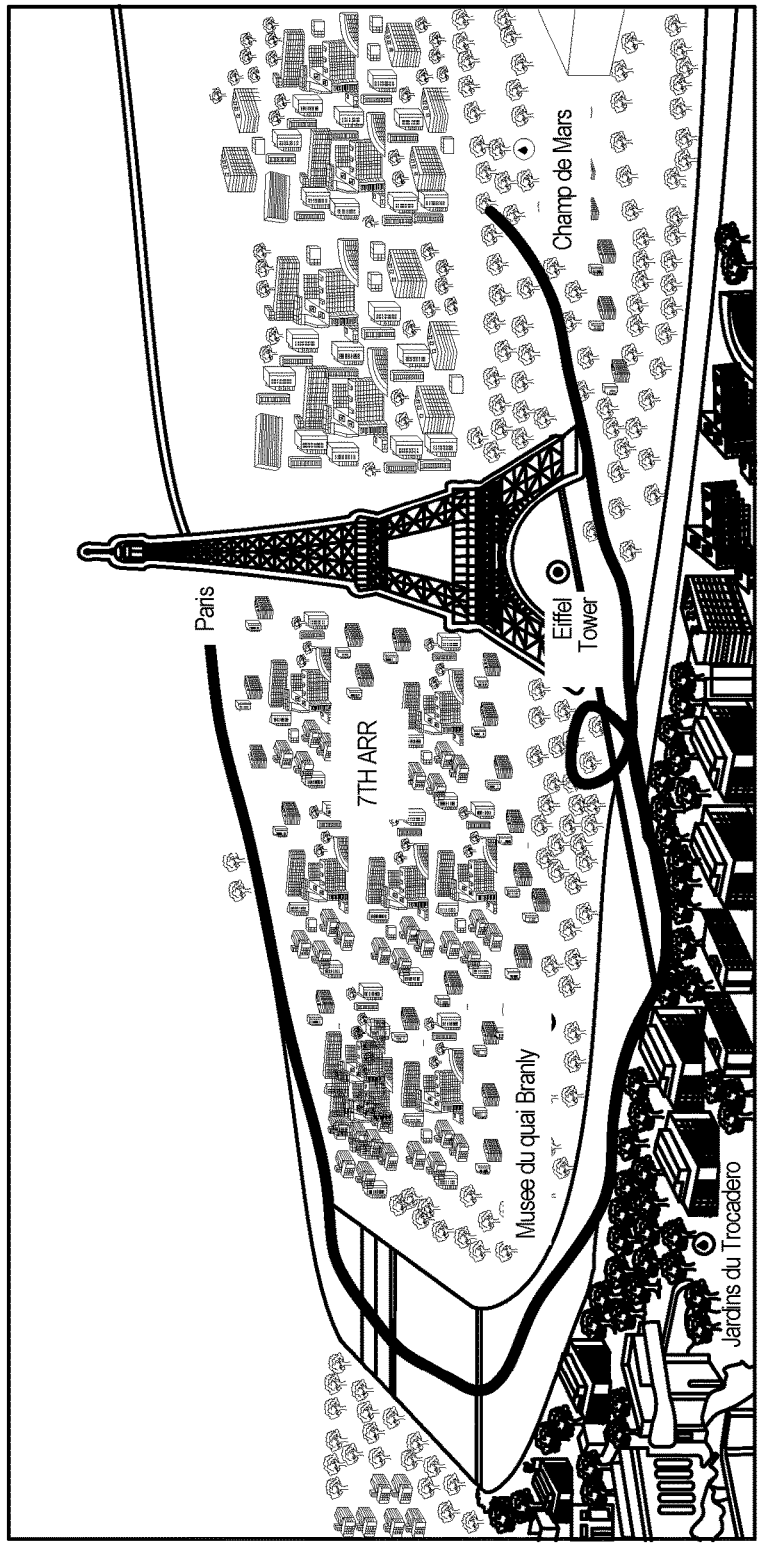
FIG. 1 depicts an example map view, in accordance with some example embodiments.

Like labels are used to refer to same or similar items in the drawings.

DETAILED DESCRIPTION

Although browsing a two-dimensional (2D) map is more common and natural for most, exploring a three-dimensional (3D) map using a proper position and a proper viewpoint may be more difficult for some. Moreover, the 2D map user experience may be different and not relevant in some respects to the 3D map user experience as the 3D map user is no longer limited to the ground plane and, as such, the mapping experience can virtually change the viewpoint to almost anywhere and in almost any direction. As such, a 3D map user may find him/herself lost for example with a position in the middle of a cloud or a viewpoint looking straight up into a cloud or a blue sky. These impractical viewing positions or viewpoints may make the 3D map viewing experience difficult and provide a less than desirable viewing experience. Indeed, in the 3D map domain, there is an almost limitless quantity of impractical viewing positions and viewpoints. Moreover, maintaining interesting viewing positions and viewpoints over a long journey, such as the path marked at FIG. 1 (showing a path around the Eiffel Tower), can be tedious and distracting.

In some example embodiments, a user-friendly recommended browsing path is provided, so that the burden of navigating within a 3D map may be reduced, if not, eliminated by at least providing one or more recommended browsing paths.

In some example embodiments, the recommended browsing path comprising positions and/or viewpoints may be generated. The positions may include latitude, longitude, and altitude, although some other form of position may be used as well. The viewpoints may be implemented as a so-called 3D look angle, defining what a virtual camera is viewing.

In some example embodiments, a recommended browsing path may be generated based on past browsing paths. In some example embodiments, the past browsing paths may include crowd-sourced browsing paths.

In some example embodiments, browsing paths may be gathered and stored in a database, such as a spatial motion database that can be queried for a recommended browsing path.

In some example embodiments, map views generated while browsing (for example, traversing) through a 3D map be sampled. These 3D maps view may be from the perspective of a virtual camera. Sampling may include the virtual camera's position, view point, and/or direction of travel. For example, while browsing the 3D map, a time sequence of one or more virtual camera map views may be sampled. In some example embodiments, the samples from this 3D map browsing session (as well as other 3D browsing sessions from the same or other users including crowd sourced users) may be aggregated into corresponding spatial clusters. A spatial cluster may represent a group of samples that are the same or similar with respect to position, viewpoint, and/or direction of travel. The spatial clusters may be stored in a database, such as a spatial motion database. The stored spatial clusters may be queried based on at least position, viewpoint, and/or direction of travel in order to obtain a recommended browsing path (or portion thereof). This recommended browsing path may be used to guide browsing (as viewed by the virtual camera) through the 3D map.

In some example embodiments, the recommended browsing path may take into account a position of the virtual camera, a viewpoint of the virtual camera, and/or a direction of travel. Moreover, a recommended browsing path may take into account previous browsing paths from the user or other users, which as noted may be crowd-sourced.

In some example embodiments, the recommended browsing path may be used to suggest a social interaction (for example, via social network and/or other communication media). For example, two user equipment sharing a common, recommended browsing path, in accordance with some example embodiments, may receive a recommendation message that the two user equipment happen to be sharing a similar recommended browsing path around a given tourist site for example.

Figure 2A:
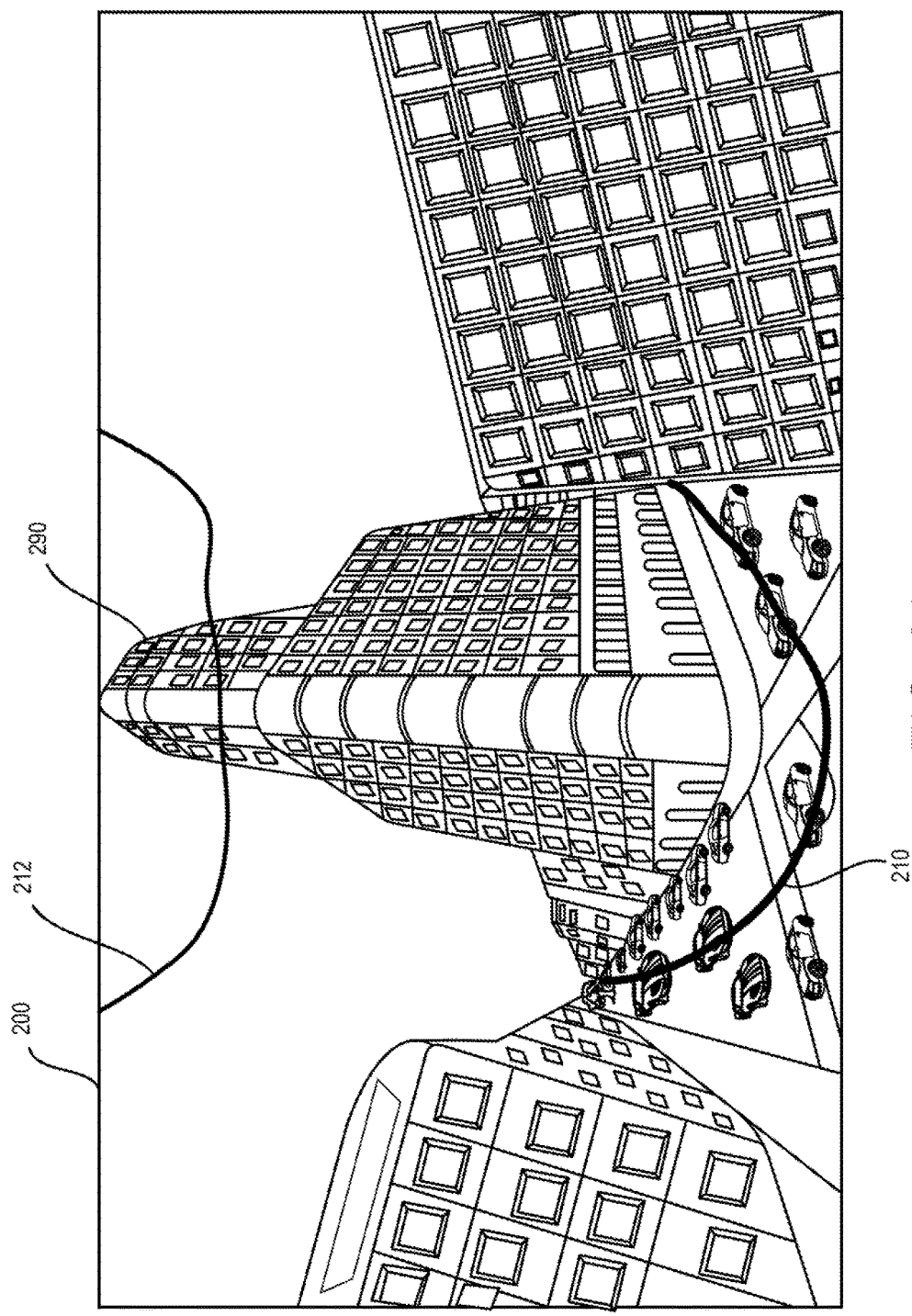
FIGS. 2A-2B depict examples of map views including recommended browsing paths, in accordance with some example embodiments.

FIG. 2A depicts a browser 200 including a virtual camera's map view presented in browser 200 as it traverses a 3D map, in accordance with some example embodiments.

The view of the building 290 may represent a virtual camera's perspective view having a position, a viewpoint, and/or a direction of travel. In this example, the virtual camera's position, viewpoint, and/or direction of travel may be sampled. These samples may be used to query a database, such as a spatial motion database, storing spatial clusters. In response to the query, the spatial motion database may provide one or more recommended browsing paths, such as paths 210 or 212. The viewer may choose to proceed on one of the paths by selecting one of the paths or, instead choose to traverse the 3D map without using the recommended browsing path (in a so-called "freestyle mode"). In some example embodiments, the recommended browsing paths may be generated from crowd-sourced user data as the crowd-sourced users browse through their corresponding 3D maps including landmark 290 for example.

In the example of FIG. 2A, the first recommended browsing path 210 corresponds to a path obtained from ground level data at the spatial motion database, while the second recommended browsing path 212 corresponds to bird's eye view data. In this example, a browser action may indicate a selection of one of the paths, in which case the user can proceed along the browsing path including a suggested viewpoint (which may include a virtual camera's look angle towards building 290).

Figure 2B:
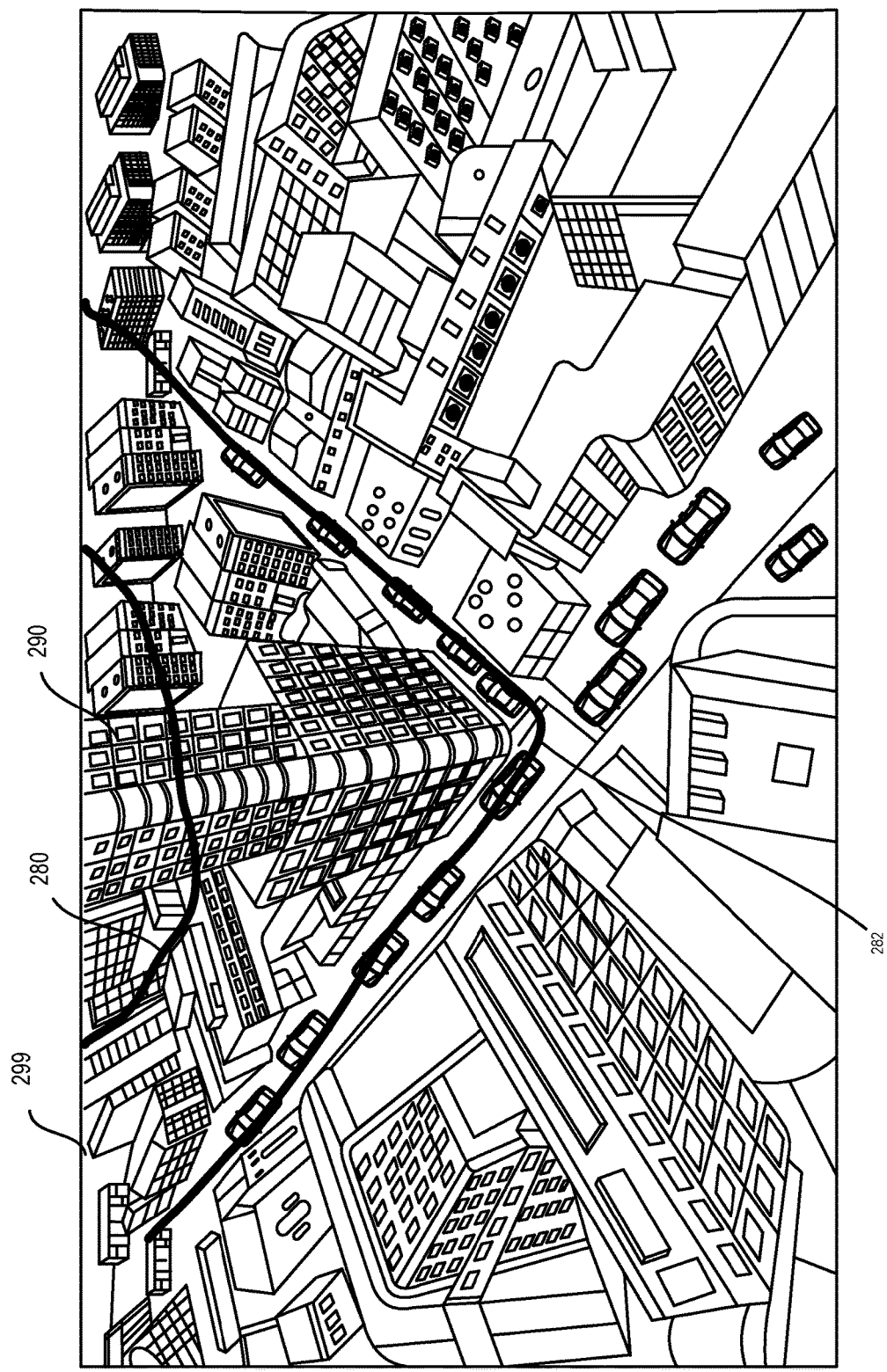

FIG. 2B depicts a browser 299 including another virtual camera's view presented in browser 299 as it traverses a 3D map, in accordance with some example embodiments. The browser's virtual camera 299 viewpoint is from a different camera angle (for example, a bird's eye view), when compared to FIG. 2A. In the example of FIG. 2B, as the virtual camera browses near landmark 290, the browser 299 may be sampled, which may serve as a query to the spatial motion database. The spatial motion database may, in response to the query, provide two recommended browsing paths 280 and 282, either of which can be selected at browser 299 when traversing the 3D map including the landmark 290.

Figure 3A:
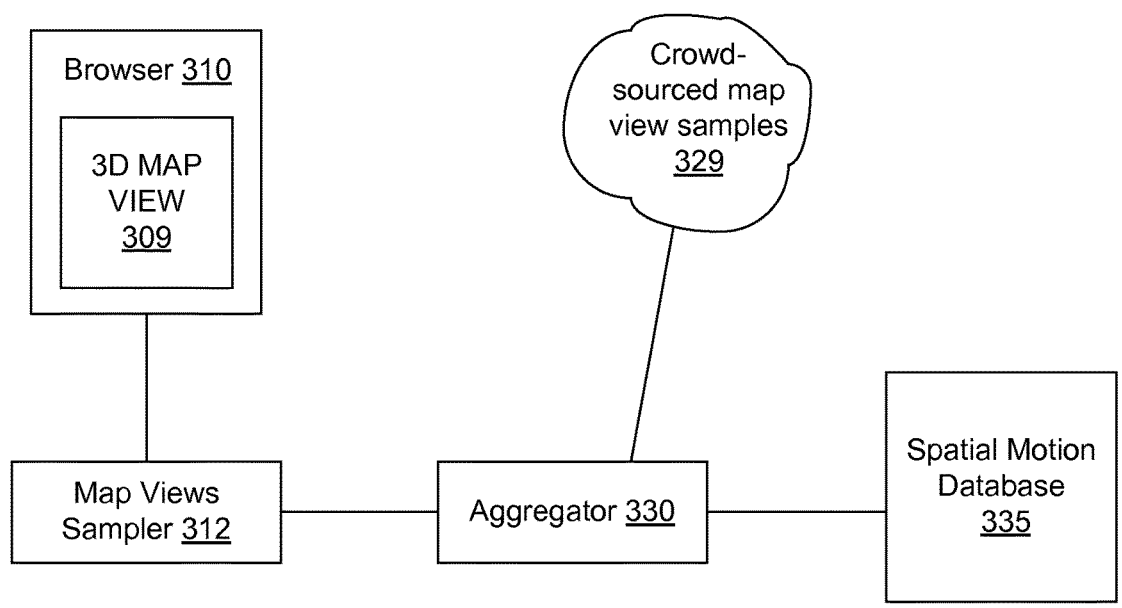
FIG. 3A depicts an example of a system for providing map view route data including crowd-sourced data to a database, in accordance with some example embodiments.

FIG. 3A depicts a block diagram of a system 300 configured to sample browsing paths from 3D maps, in accordance with some example embodiments. The description of FIG. 3A also refers to FIGS. 2A-2B.

The system 300 may include a browser 310, such as browsers 200 and 299 for example. Browser 310 may be used to traverse through a 3D map. As the 3D map is accessed and traversed, browser 310 may present a time sequence of 3D map views 309, such as the map views shown at FIGS. 2A and 2B for example.

System 300 may include a map sampler 312 to sample one or more map views as the browser accesses and traverses the 3D map. Referring to FIG. 2A, the map views at FIG. 2A may be sampled by map sampler 312 so that the position of the map view (which represents a position from the perspective of a virtual camera associated with the map view). Alternatively or additionally, the viewpoint of the virtual camera may also be sampled and/or the direction of the virtual camera's travel may be sampled as well. Referring to FIG. 2A, latitude, longitude, and/or altitude of the virtual camera providing the 3D map view may be sampled as a position. In addition, the azimuth and elevation (which in this example corresponds to the virtual camera's look angle in the direction of landmark 290) may be sampled as the viewpoint. Moreover, if a direction of travel can be determined from browser interactions (for example, if a browser interaction suggests a move to the right of the building 290), this browser interactions may be used as a direction of travel. These samples may be sent to aggregator 230, in accordance with some example embodiments. Moreover, the samples may, as noted, be used to query the spatial motion database in order to receive a recommended browsing path for the 3D map.

System 300 may include an aggregator 330, in accordance with some example embodiments. The aggregator 330 may cluster samples so that the same or similar samples are grouped, in accordance with some example embodiments. For example, a cluster of samples that are the same or similar with respect to location, viewpoint, and/or direction of travel may be formed into a spatial cluster. The cluster of samples may include samples from browser 310, prior samples from browser 310, prior samples from other browser sessions, crowd-sourced samples 329 (which may be obtained from other browsers traversing a 3D map), and/or the like.

System 300 may also include a database, such as a spatial motion database 335, in accordance with some example embodiments. The spatial motion database 335 may store clusters of samples. Moreover, the clusters may be queried to determine a recommended browsing path, which can be provided to browser 210, in accordance with some example embodiments.

Figure 3B:
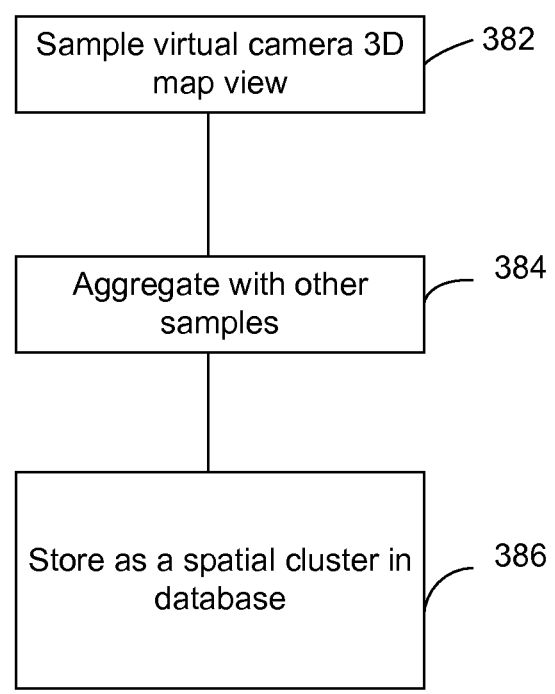
FIG. 3B depicts an example of a process for providing map view route data including crowd-sourced data to a database, in accordance with some example embodiments.

FIG. 3B depicts an example process 380 for clustering 3D map view samples, in accordance with some example embodiments. The description of FIG. 3A also refers to FIG. 3B.

At 382, one or more 3D map views may be sampled, in accordance with some example embodiments. For example, map sampler 312 may sample the position of a virtual camera's map view at browser 310, a viewpoint of the virtual camera's map view at browser 310, and/or a direction of travel of virtual camera map view at browser 310.

At 384, 3D map view samples may be aggregated, in accordance with some example embodiments. For example, aggregator 330 may group samples that are the same or similar with respect to location, viewpoint, and/or direction of travel into a spatial cluster.

Figure 3C:
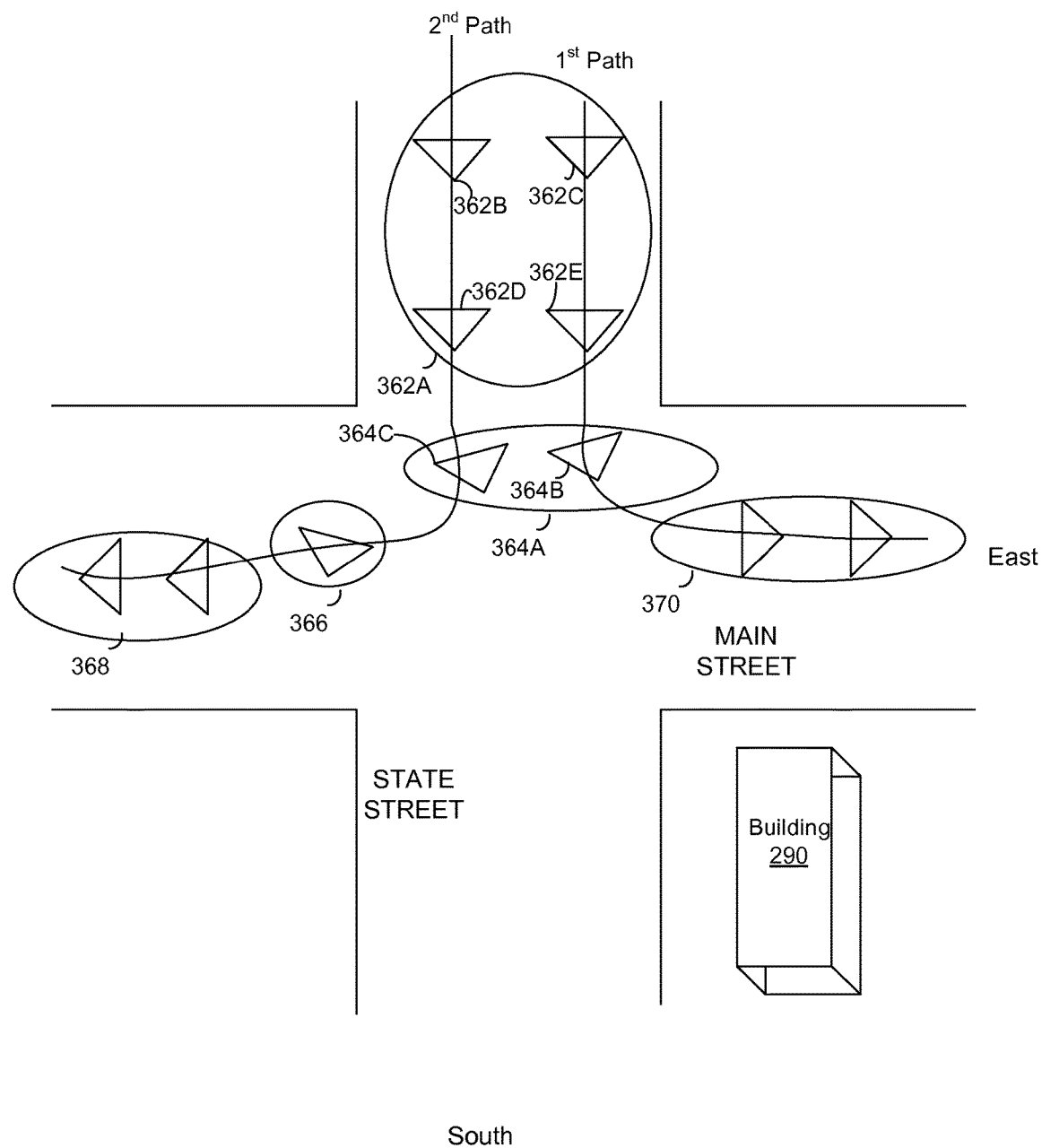
FIG. 3C depicts an example of spatial clustering, in accordance with some example embodiments.

FIG. 3C depicts a representation of spatial clusters 362A, 364A, 366, 368, and 370 located generally in the vicinity of Main Street and State Street, in accordance with some example embodiments. In this example, spatial cluster 362A may include map view samples 362B-E (represented by the triangles), each of which may have a similar position, similar viewpoint (generally point South), and similar direction of travel (generally traveling along a North-South axis). Spatial cluster 364A may include map view samples 364B-C (represented by the triangles), each of which may have a similar position, similar viewpoint (generally pointing Southeast), and along similar direction of travel axis (generally traveling along a North-South axis). Regarding direction of travel for a given spatial cluster, the direction may be bi-directional so the cluster may be used in a North to South direction of travel as well as a South to North direction of travel.

Each of the spatial clusters may represent an aggregate (for example, a combination, an average, and/or the like) of one or more map view samples, in accordance with some example embodiments. As such, a spatial cluster may have an aggregate position, an aggregate viewpoint, and/or an aggregate direction of travel, and the spatial cluster may be associated with, or linked to, other spatial clusters. For example, spatial cluster 362A may define a position, viewpoint, and direction of travel and be linked to cluster 364A to form a portion of a recommended browsing path, in accordance with some example embodiments. Moreover, the spatial clusters may be stored at a database, such as spatial motion database 335.

Figure 3D:
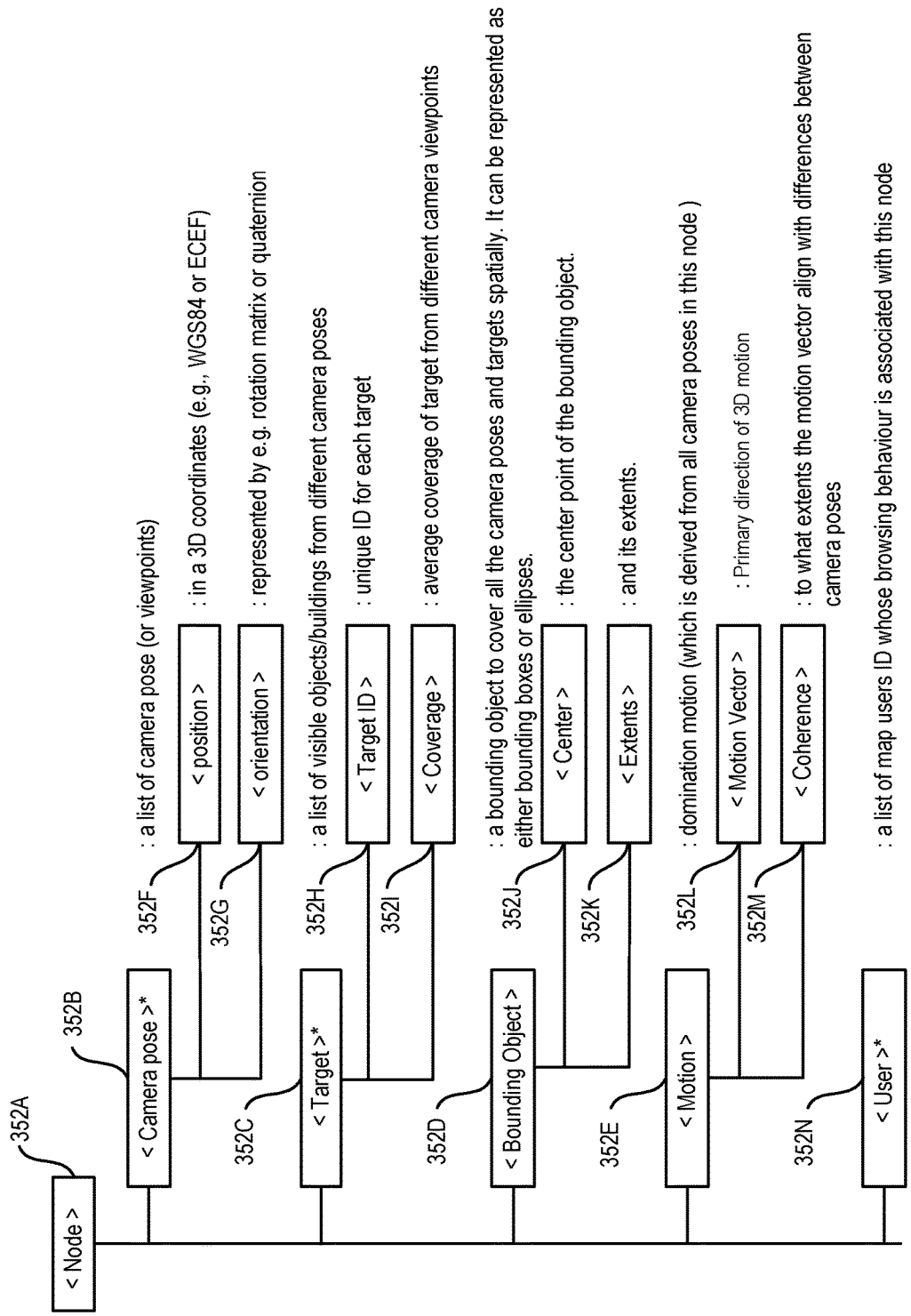
FIG. 3D depicts an example of a data format for a spatial cluster, in accordance with some example embodiments.

FIG. 3D depicts an example data format for a spatial cluster, in accordance with some example embodiments.

The spatial cluster may be stored in a database, such as spatial motion database 335 as a node 352A, in accordance with some example embodiments. Node 352A may include camera pose data 352B, target data 352C, bounding object data 352D, motion data 352E and/or user data 352N. The camera pose 352B may include one or more positions 352F, such as latitude, longitude, and/or altitude (which may be in accordance with a coordinate standard format such as World Geodetic Survey 84, Earth-Centered, Earth-Fixed, and/or the like). The camera pose 352B may include one or more viewpoints 352G representative of the look angle (which may comprise a rotation matrix and/or the like for example). The target 352C may include one or more visible objects, such as buildings, landmarks, and/or the like that may be visible from the spatial cluster. Each object may be identified by a unique identifier 352H. The target data 352C may also include coverage area 352I for the visible object. The bounding object may 352D may represent the region covered by the spatial cluster. As such, the bounding object 352D may include a center 352J and how far the region extends 352K. The motion 352E may include a motion vector 352L and coherence 352M. The motion vector 352L may indicate virtual camera samples aggregated into a given spatial cluster. For example, the motion vector 352L may indicate that motion inside the spatial cluster may occur along an East-West axis with respect to direction. As noted above, the direction may be bi-directional as well. The coherence 352M may be an indicator of the variance of the motion directions within a given spatial cluster. If all the motion samples are along the same bi-directional axis, the spatial cluster may have a high, relative coherence. On the other hand, if motion samples are more random, the coherence may be lower. The coherence may be used when creating animated camera motion paths between spatial clusters to weight the motion paths in the direction of primary motion. To illustrate, this may cause spatial clusters in the middle of a street for example to likely receive a high coherence and, as such, result in motion paths entering or exiting that spatial cluster to generally move along the direction of the street. In the middle of an intersection, the coherence of motion may be weighted lower. When this is the case, the motion paths may be more dependent on the motion direction of the node they lead to. The user data 352N may include a list of map users IDs whose browsing behavior is associated with the node.

Regarding the bounding object 352D, the bounding object may represent a variety of shaped objects, such as boxes/cubes, ellipses, and/or the like.

Referring again to FIG. 3B, one or more spatial clusters may be stored, at 386, in a database, such as a spatial motion database, in accordance with some example embodiments. For example, spatial clusters 362A, 364A, 366, 368, and 370 may be stored in spatial motion database 335. Moreover, the spatial clusters may be stored in accordance with a data format, such as the format shown at FIG. 3D, although other formats may be used as well. The stored spatial clusters may be queried based on a position, viewpoint, and/or direction of travel to identify candidate spatial cluster(s) that can be formed into a recommended browsing path (or portion thereof) and provided to browser 310.

Although FIG. 3C depicts cluster 362A as having 2 paths, a spatial cluster may be configured to only have a single path. For example, in the case of FIG. 3C, spatial cluster 362A may include 362C and 362E, while another cluster may be formed for 362B and 362D.

To illustrate by way of the example of FIG. 3C, spatial motion database 335 may receive a query including position corresponding to the intersection of Main Street and State Street and a viewpoint looking at building 290. When this is the case, the spatial motion database may return at least spatial cluster 364A as a recommended browsing path (or portion thereof). If the query also includes an indication of direction of travel corresponding to East, the spatial motion database may also return at least spatial cluster 370 which may be linked (or associated with) spatial cluster 370.

In some example embodiments, spatial motion database 335 may include crowd-sourced spatial clusters obtained from a plurality of user equipment including browsers traversing 3D map data. The crowd-sourced map samples 329 may be aggregated into the spatial clusters to provide enhanced recommended browsing path, when compared to paths not using crowd-sourced samples. In some example embodiments, a browser may include a user interface element which can be selected in order to share map view samples with spatial motion database as part of the crowd-sourcing of map views. Moreover, the spatial motion database may include refereed browsing paths for popular landmarks, which may also be provided to the browser as a recommended browsing path. For example, browsing paths for a certain celebrity or a certain travel advisor may be stored as well, and selectable via the browser for presentation at the browser as a recommended browsing path.

In some example embodiments, the spatial motion database may automatically provide to the browser a prior, browsing path as a recommended browsing path.

In some example embodiments, social connections may be established among user equipment (each of which may include browser 310 having the 3D map views) exhibiting similar browsing patterns. For example, if two users are viewing building 290 at Main and State streets, the user's may receive a message indicating that other are viewing the building 290. Moreover, the viewing paths of the user's friends on social media (for example, Facebook) can be highlighted and recommended accordingly.

In some example embodiments, keywords may be collected and stored at spatial motion database 335 to enable searching including a social search of local map searches to enable suggestions to other users. For example, spatial clusters forming a path around the Eiffel Tower may be associated with a keyword, such as Eiffel tower, to enable a quick search. The keyword may be linked to node 352 in accordance with some example embodiments. To further illustrate, spatial motion database may include a plurality of spatial clusters forming a bird's eye view of the Eiffel Tower. These spatial clusters may be linked to the keywords "Eiffel Tower Bird's Eye," so a query with that phrase (or portions of that phrase) may cause a recommended browsing path of the Eiffel Tower (from the bird's eye) to be provided to browser 310.

Figure 4A:
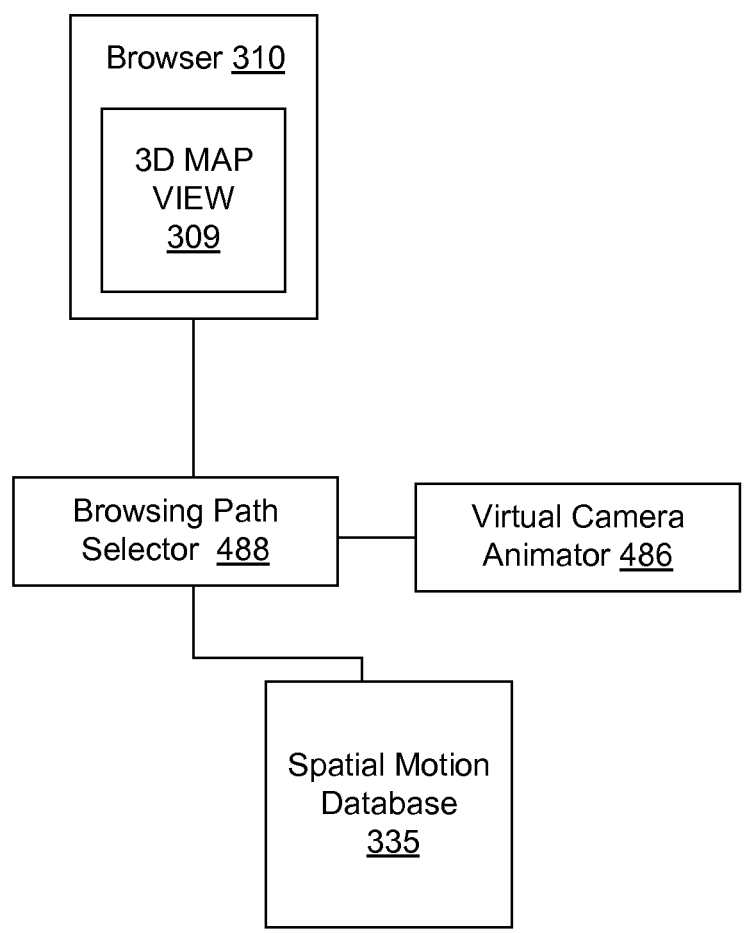
FIG. 4A depicts an example of a system for receiving recommended browsing paths, in accordance with some example embodiments.

FIG. 4A depicts an example of a system 400 including browser 310 coupled to a browsing path selector 488, a camera animator 486, and spatial motion database 335, in accordance with some example embodiments. The spatial motion database 335 is queried for available/best motion paths based on current node, viewing direction, and desired direction of motion. The camera animator 486 is responsible for effecting the virtual camera motion once a path has been selected. The path selection can happen via the user selecting one of several options offered in the UI, automatically based on user interaction indicating desired direction of motion, or as a combination of these.

The browsing path selector 488 may obtain from browser 310 a current position for the virtual camera's 3D map view, a viewpoint, and/or a desired direction of travel. A desired direction may be indicated by a user interaction and/or may be predicted based on user's recent browsing history (for example, a user may be more likely to continue in same general direction). The browsing path selector 488 may then send to camera animator 486 and spatial motion database 335 the virtual camera's current position, current viewpoint, and/or the desired direction of travel. The current position, current viewpoint, and/or the desired direction of travel may be used to query the spatial motion database 335 for a recommended browsing path. In response to the query, a recommended browsing path may be returned to the camera animator 486 and/or browser 310 for presentation and/or selection. Moreover, the recommended browsing path may take into account crowd-sourced data.

Figure 4B:
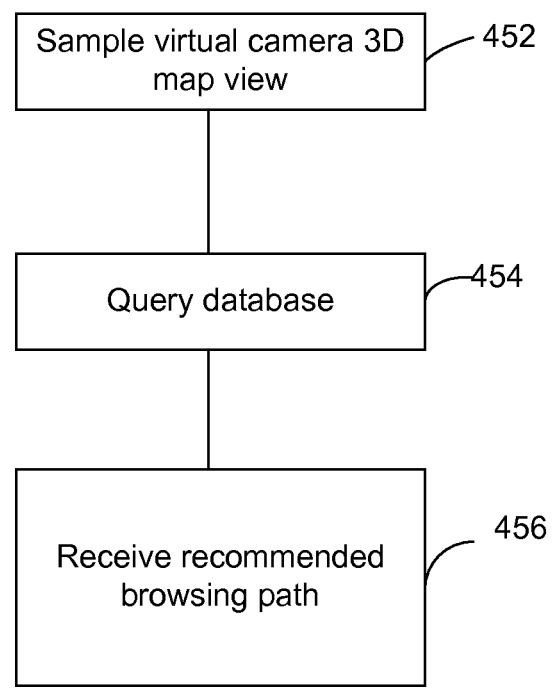
FIG. 4B depicts an example of a process for receiving recommended browsing paths, in accordance with some example embodiments.

FIG. 4B depicts an example process 499 for provided a recommended 3D browsing path, in accordance with some example embodiments. The description of FIG. 4B also refers to FIG. 4A.

At 452, 3D map views may be sampled, in accordance with some example embodiments. For example, the position of a virtual camera's view at browser 310, a viewpoint of the virtual camera at browser 310, and/or a direction of travel of the virtual camera at browser 310 may be provided to the browsing path selector 488, which in turn may forward this information to spatial motion database 335 and/or virtual camera animator 486.

At 454, a database may be queried, in accordance with some example embodiments. For example, spatial motion database 335 may receive the sampled position, sampled viewpoint, and/or sampled direction of travel. Next, the spatial motion database 335 may search for one or more spatial clusters that are the same or similar to the received samples. To illustrate, the closest spatial cluster to the received samples may represent the spatial cluster that is the most similar and, as such, most likely to have the same or similar position, viewpoint, and/or direction of travel.

In some example embodiments, a metric may be used at 454 to calculate the degree of similarity between the received samples and one or more spatial clusters. The closest spatial cluster(s) may be determined based on the metric (for example, a distance metric, similarity metric, and/or the like). Moreover, the selected spatial cluster may also be associated with other spatial clusters forming a path. In some example embodiments, the selected spatial cluster and the associated spatial clusters may be selected as part of the query to form a portion of the recommended browsing path. For example, each of the spatial clusters may be linked to form a recommend browsing path (or portion thereof) having position(s), viewpoint(s), and/or direction(s) of travel.

At 456, the recommended browsing path may be received, in accordance with some example embodiments. For example, browser 310 may receive the recommended browsing path from spatial motion database 335.

In some example embodiments, the recommended guided path may be provided as an option for selection via the browser. The recommended guided path may be provided with a selection causing the camera animator 486 to move the virtual camera according to the selected path. The one or more recommended browsing paths may be presented at browser 310. A selection may be performed at browser 310 to select among paths 280 and 282 for example, (FIG. 2B) or instead choose to not follow the recommended browsing paths (in a so-called freestyle browsing mode). In some example embodiments, the selection of a browsing path may be an explicit click or selection of the browsing path, although the selection may be less explicit. For example, a browsing interaction indicating a move toward the guided path may cause the camera animator 486 to automatically move the virtual camera to the guided path with an appropriate viewpoint. Moreover, subsequent browser interactions indicating direction of travel may automatically provide additional adjacent nodes along the guided path.

In some example embodiments, the recommended path may be provided automatically and the camera animator 486 move the browsing session along the recommended browsing path.

In some example embodiments, a virtual camera view may be an entity comprising C=[R|T], wherein C represents camera pose, R represents camera rotation, and T represents translation. This entity may define a virtual camera view, and may be stored, shared, and/or transferred among user equipment and/or other devices at system 200 and/or 300. In some example embodiments, a virtual camera's path may be represented by one or more camera poses P={C1, C2, C3, . . . }. A cluster of these path may be represented by a set of camera motion paths K={P1, P2, P3, . . . }. Path clustering and aggregation algorithms are applied to recorded raw viewing.

Figure 5:
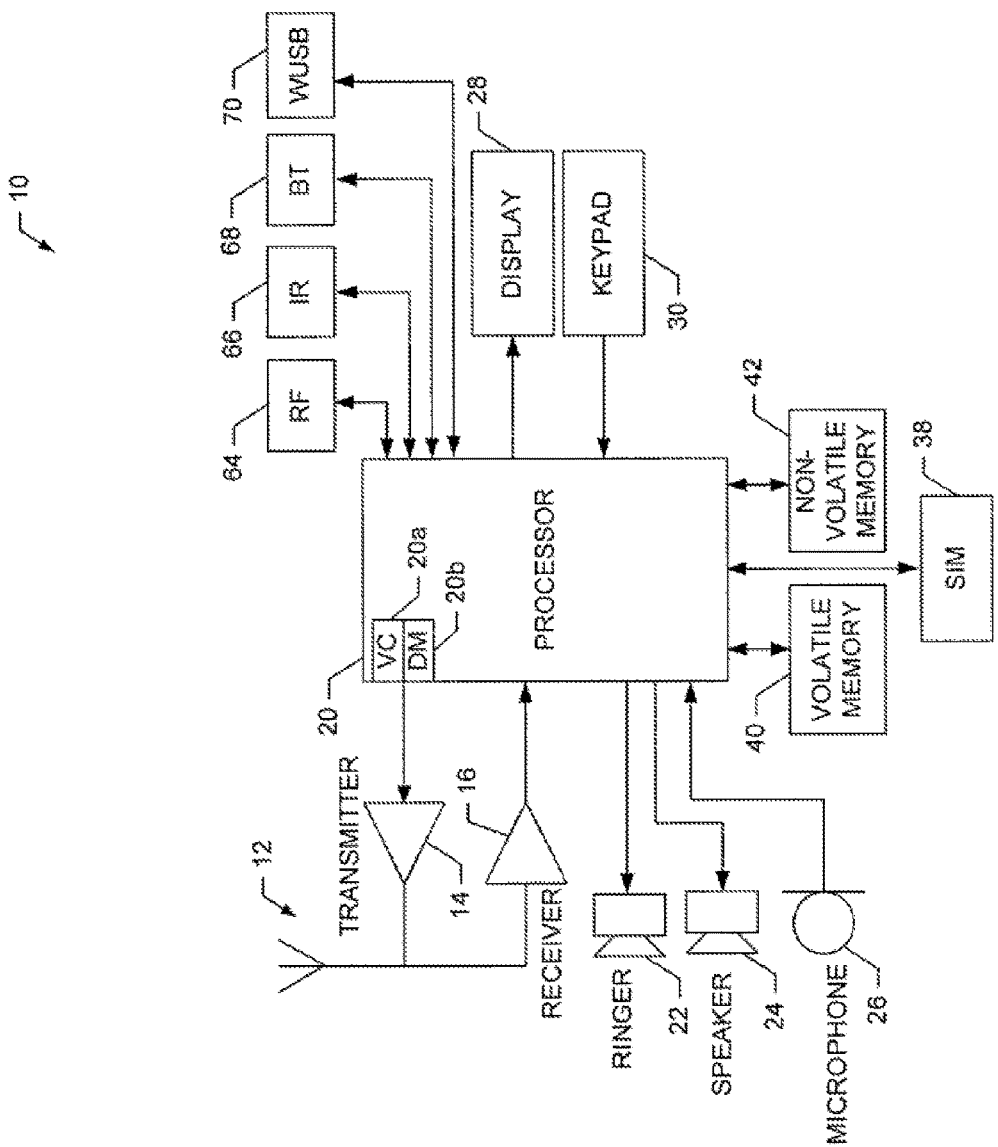
FIG. 5 depicts an example of an apparatus, in accordance with some example embodiments.

FIG. 5 depicts a block diagram of an apparatus 10 that may include browser 310, in accordance with some example embodiments.

Although FIG. 5 describes the apparatus 10 as a mobile wireless device, stationary and/or wired processors may be used as well, such as a computer, laptop, and/or the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or any subsequent revisions or improvements to these standards. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, LTE-Direct, LTE-Unlicensed, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. For example, the PND may provide voice commands to enable voice-guided navigation. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/ or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. The apparatus 10 may also include for example short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like. The apparatus may also include (or be coupled to) a global positioning system receiver circuitry providing location information to the apparatus.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to provide the operations disclosed herein including process 380, 499, and/or the like. The memories may comprise an identifier, such as an international mobile equipment identification (IMEI) code, capable of uniquely identifying apparatus 10. The functions may include the operations disclosed herein including the following: sampling a position and a viewpoint of a three-dimensional map view presented at a browser while traversing the three-dimensional map; sending to a database a query including the sampled viewpoint and the sampled viewpoint; and receiving, in response to the sent query, a recommended browsing path including a recommended position and a recommended viewpoint for traversing the three-dimensional map presented at the browser, wherein the recommended browsing path represents an aggregation including crowd-sourced information for position and viewpoint.

In the example embodiment, the processor 20 may be configured using computer code stored at memory 40 and/or 42 to perform operations as disclosed herein with respect to process 380, 499, and/or the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing herein, a technical effect of one or more of the example embodiments disclosed herein may include enhanced user interface interaction and browsing experience in 3D maps.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

As used herein, a 3D map represents a map that includes a third-dimension, such as height). For example, a 3D map may depict building and give a sense of their height relative to other buildings and objects.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. An method comprising:
    sampling a position and a viewpoint of a three-dimensional map view presented at a browser while traversing the three-dimensional map;
    sending to a database a query including the sampled position and the sampled viewpoint; and
    receiving, in response to the sent query, a recommended browsing path including a recommended position and a recommended viewpoint for traversing the three-dimensional map presented at the browser, wherein the recommended browsing path represents an aggregation including crowd-sourced information for position and viewpoint wherein at least one processor performs the sampling, the sending, and the receiving.

2. The method of claim 1, wherein the aggregation includes past samples of position information.

3. The method of claim 1, wherein the aggregation includes past samples of viewpoint information.

4. The method of claim 1, wherein the crowd-sourced information for position and viewpoint includes past samples of position information and past samples of viewpoint information obtained from a plurality of users coupled by at least one of a network or a social network.

5. The method of claim 1, wherein the position represents a latitude, a longitude, and an altitude.

6. The method of claim 1, wherein the viewpoint represents a look angle from the perspective of a virtual camera generating the three-dimensional map view.

7. The method of claim 1, wherein the recommended browsing path is determined from a query of at least one spatial cluster stored at a database.

8. The method of claim 7, wherein the at least one spatial cluster is stored as a node including at least one of camera pose information, target information, bounding object information, motion information, or user information.

9. The method of claim 1, further comprising:
    initiating, based on the received recommended browsing path, a connection to another user equipment having a same or similar recommended browsing path.

10. The method of claim 1, further comprising:
    selecting the received recommended browsing path for traversing the three-dimensional map presented at the browser.

11. The method of claim 1, further comprising:
    receiving, in response to the sent query, a first recommended browsing path and a second recommended browsing path; and
    selecting from one of the first recommended browsing path, the second recommended browsing path, or a freestyle browsing mode.

12. An apparatus, comprising:
    at least one processor; and
    at least one memory including computer program code, the at least one memory and the computer program code configured to, with the at least one processor, cause the apparatus to perform at least the following:
        sample a position and a viewpoint of a three-dimensional map view presented at a browser while traversing the three-dimensional map;
        send to a database a query including the sampled position and the sampled viewpoint; and
        receive, in response to the sent query, a recommended browsing path including a recommended position and a recommended viewpoint for traversing the three-dimensional map presented at the browser, wherein the recommended browsing path represents an aggregation including crowd-sourced information for position and viewpoint.

13. The apparatus of claim 12, wherein the aggregation includes past samples of position information.

14. The apparatus of claim 12, wherein the aggregation includes past samples of viewpoint information.

15. The apparatus of claim 12, wherein the crowd-sourced information for position and viewpoint includes past samples of position information and past samples of viewpoint information obtained from a plurality of users coupled by at least one of a network or a social network.

16. The apparatus of claim 12, wherein the position represents a latitude, a longitude, and an altitude.

17. The apparatus of claim 12, wherein the viewpoint represents a look angle from the perspective of a virtual camera generating the three-dimensional map view.

18. The apparatus of any of claim 12, wherein the recommended browsing path is determined from a query of at least one spatial cluster stored at a database.

19. The apparatus of claim 18, wherein the at least one spatial cluster is stored as a node including at least one of camera pose information, target information, bounding object information, motion information, or user information.

20. The apparatus of claim 12, wherein the apparatus is further configured to at least initiate, based on the received recommended browsing path, a connection to another user equipment having a same or similar recommended browsing path.

21. The apparatus of claim 12, wherein the apparatus is further configured to at least select the received recommended browsing path for traversing the three-dimensional map presented at the browser.

22. The apparatus of claim 12, wherein the apparatus is further configured to at least:

receive, in response to the sent query, a first recommended browsing path and a second recommended browsing path; and select from one of the first recommended browsing path, the second recommended browsing path, or a freestyle browsing mode.

23. A non-transitory computer-readable storage medium including program code which when executed causes operation comprising:

sampling a position and a viewpoint of a three-dimensional map view presented at a browser while traversing the three-dimensional map;

sending to a database a query including the sampled position and the sampled viewpoint; and receiving, in response to the sent query, a recommended browsing path including a recommended position and a recommended viewpoint for traversing the three-dimensional map presented at the browser, wherein the recommended browsing path represents an aggregation including crowd-sourced information for position and viewpoint wherein the program code causes at least one processor to perform the sampling, the sending, and the receiving.

* * * * *